(12) United States Patent
Reshef et al.

(10) Patent No.: US 11,276,407 B2
(45) Date of Patent: Mar. 15, 2022

(54) METADATA-BASED DIARIZATION OF TELECONFERENCES

(71) Applicant: GONG I.O LTD., Herzliya Pituach (IL)

(72) Inventors: Eilon Reshef, Tel Aviv (IL); Hanan Shteingart, Herzliya (IL); Zohar Shay, Even Yehuda (IL)

(73) Assignee: GONG.IO LTD., Ramat Gan (IL)

( * ) Notice: Subject to any disclaimer, the term of this patent is extended or adjusted under 35 U.S.C. 154(b) by 98 days.

(21) Appl. No.: 16/297,757

(22) Filed: Mar. 11, 2019

(65) Prior Publication Data

US 2019/0318743 A1 Oct. 17, 2019

Related U.S. Application Data

(60) Provisional application No. 62/658,604, filed on Apr. 17, 2018.

(51) Int. Cl.
*G10L 17/00* (2013.01)
*G10L 17/04* (2013.01)
(Continued)

(52) U.S. Cl.
CPC ............ *G10L 17/00* (2013.01); *G10L 15/26* (2013.01); *G10L 17/04* (2013.01); *G10L 25/78* (2013.01); *G10L 2025/783* (2013.01)

(58) Field of Classification Search
CPC .... G10L 25/78; G10L 2025/783; H04M 3/56; H04M 3/5175; H04M 2201/41
(Continued)

(56) References Cited

U.S. PATENT DOCUMENTS 6,185,527 B1 2/2001 Petkovic et al.
6,324,282 B1 11/2001 McIllwaine et al.
(Continued)

FOREIGN PATENT DOCUMENTS

| CN | 108920644 A | 11/2018 |
|---|---|---|
| WO | 2005071666 A1 | 8/2005 |
| WO | 2012151716 A1 | 11/2012 |

OTHER PUBLICATIONS

Makhoul et al. "Speech and Language Technologies for Audio Indexing and Retrieval". Proceedings of the IEEE, vol. 88, No. 8, Aug. 2000, pp. 1338-1353 (Year: 2000).*

(Continued)

*Primary Examiner* — Jesse S Pullias
(74) *Attorney, Agent, or Firm* — Kligler & Associates Patent Attorneys Ltd

(57) ABSTRACT

A method for audio processing includes receiving, in a computer, a recording of a teleconference among multiple participants over a network including an audio stream containing speech uttered by the participants and conference metadata for controlling a display on video screens viewed by the participants during the teleconference. The audio stream is processed by the computer to identify speech segments, in which one or more of the participants were speaking, interspersed with intervals of silence in the audio stream. The conference metadata are parsed so as to extract speaker identifications, which are indicative of the participants who spoke during successive periods of the teleconference. The teleconference is diarized by labeling the identified speech segments from the audio stream with the speaker identifications extracted from corresponding periods of the teleconference.

31 Claims, 7 Drawing Sheets

(51) Int. Cl.
    *G10L 25/78*     (2013.01)
    *G10L 15/26*     (2006.01)

(58) Field of Classification Search
    USPC .................................. 704/231–257, 270–275
    See application file for complete search history.

(56) References Cited

U.S. PATENT DOCUMENTS

| | | |
|---|---|---|
| 6,363,145 B1 | 3/2002 | Shaffer et al. |
| 6,434,520 B1 | 8/2002 | Kanevsky et al. |
| 6,542,602 B1 | 4/2003 | Elazar |
| 6,603,854 B1 | 8/2003 | Judkins et al. |
| 6,721,704 B1 | 4/2004 | Strubbe et al. |
| 6,724,887 B1 | 4/2004 | Eilbacher et al. |
| 6,741,697 B2 | 5/2004 | Benson et al. |
| 6,775,377 B2 | 8/2004 | McIllwaine et al. |
| 6,914,975 B2 | 7/2005 | Koehler et al. |
| 6,922,466 B1 | 7/2005 | Peterson et al. |
| 6,959,080 B2 | 10/2005 | Dezonno et al. |
| 6,970,821 B1 | 11/2005 | Shambaugh et al. |
| 7,010,106 B2 | 3/2006 | Gritzer et al. |
| 7,076,427 B2 | 7/2006 | Scarano et al. |
| 7,151,826 B2 | 12/2006 | Shambaugh et al. |
| 7,203,285 B2 | 4/2007 | Blair |
| 7,281,022 B2 | 10/2007 | Gruhl et al. |
| 7,305,082 B2 | 12/2007 | Elazar |
| 7,373,608 B2 | 5/2008 | Lentz |
| 7,457,404 B1 | 11/2008 | Hession et al. |
| 7,460,659 B2 | 12/2008 | Shambaugh et al. |
| 7,474,633 B2 | 1/2009 | Halbraich et al. |
| RE40,634 E | 2/2009 | Blair et al. |
| 7,548,539 B2 | 6/2009 | Kouretas et al. |
| 7,570,755 B2 | 8/2009 | Williams et al. |
| 7,577,246 B2 | 8/2009 | Idan et al. |
| 7,596,498 B2 | 9/2009 | Basu et al. |
| 7,599,475 B2 | 10/2009 | Eilam et al. |
| 7,613,290 B2 | 11/2009 | Williams et al. |
| 7,631,046 B2 | 12/2009 | Litvin et al. |
| 7,660,297 B2 | 2/2010 | Fisher et al. |
| 7,664,641 B1 | 2/2010 | Pettay et al. |
| 7,702,532 B2 | 4/2010 | Vigil |
| 7,716,048 B2 | 5/2010 | Pereg et al. |
| 7,728,870 B2 | 6/2010 | Rudnik et al. |
| 7,739,115 B1 | 6/2010 | Pettay et al. |
| RE41,608 E | 8/2010 | Blair et al. |
| 7,769,622 B2 | 8/2010 | Reid et al. |
| 7,770,221 B2 | 8/2010 | Frenkel et al. |
| 7,783,513 B2 | 8/2010 | Lee |
| 7,817,795 B2 | 10/2010 | Gupta et al. |
| 7,852,994 B1 | 12/2010 | Blair et al. |
| 7,853,006 B1 | 12/2010 | Fama et al. |
| 7,869,586 B2 | 1/2011 | Conway et al. |
| 7,873,035 B2 | 1/2011 | Kouretas et al. |
| 7,881,216 B2 | 2/2011 | Blair |
| 7,881,471 B2 | 2/2011 | Spohrer et al. |
| 7,882,212 B1 | 2/2011 | Nappier et al. |
| 7,899,176 B1 | 3/2011 | Calahan et al. |
| 7,899,178 B2 | 3/2011 | Williams, II et al. |
| 7,904,481 B1 | 3/2011 | Deka et al. |
| 7,925,889 B2 | 3/2011 | Blair |
| 7,949,552 B2 | 5/2011 | Korenblit et al. |
| 7,953,219 B2 | 5/2011 | Freedman et al. |
| 7,953,621 B2 | 5/2011 | Fama et al. |
| 7,965,828 B2 | 6/2011 | Calahan et al. |
| 7,966,187 B1 | 6/2011 | Pettay et al. |
| 7,966,265 B2 | 6/2011 | Schalk et al. |
| 7,991,613 B2 | 8/2011 | Blair |
| 7,995,717 B2 | 8/2011 | Conway et al. |
| 8,000,465 B2 | 8/2011 | Williams et al. |
| 8,005,675 B2 | 8/2011 | Wasserblat et al. |
| 8,050,921 B2 | 11/2011 | Mark et al. |
| 8,055,503 B2 | 11/2011 | Scarano et al. |
| 8,078,463 B2 | 12/2011 | Wasserblat et al. |
| 8,086,462 B1 | 12/2011 | Alonso et al. |
| 8,094,587 B2 | 1/2012 | Halbraich et al. |
| 8,094,803 B2 | 1/2012 | Danson et al. |
| 8,107,613 B2 | 1/2012 | Gumbula |
| 8,108,237 B2 | 1/2012 | Bourne et al. |
| 8,112,298 B2 | 2/2012 | Bourne et al. |
| RE43,255 E | 3/2012 | Blair et al. |
| RE43,324 E | 4/2012 | Blair et al. |
| 8,150,021 B2 | 4/2012 | Geva et al. |
| 8,160,233 B2 | 4/2012 | Keren et al. |
| 8,165,114 B2 | 4/2012 | Halbraich et al. |
| 8,180,643 B1 | 5/2012 | Pettay et al. |
| 8,189,763 B2 | 5/2012 | Blair |
| 8,194,848 B2 | 6/2012 | Zernik et al. |
| 8,199,886 B2 | 6/2012 | Calahan et al. |
| 8,199,896 B2 | 6/2012 | Portman et al. |
| 8,204,056 B2 | 6/2012 | Dong et al. |
| 8,204,884 B2 | 6/2012 | Freedman et al. |
| 8,214,242 B2 | 7/2012 | Agapi et al. |
| 8,219,401 B1 | 7/2012 | Pettay et al. |
| 8,243,888 B2 | 8/2012 | Cho |
| 8,255,542 B2 | 8/2012 | Henson |
| 8,275,843 B2 | 9/2012 | Anantharaman et al. |
| 8,285,833 B2 | 10/2012 | Blair |
| 8,290,804 B2 | 10/2012 | Gong |
| 8,306,814 B2 | 11/2012 | Dobry et al. |
| 8,326,631 B1 | 12/2012 | Watson |
| 8,340,968 B1 | 12/2012 | Gershman |
| 8,345,828 B2 | 1/2013 | Williams et al. |
| 8,396,732 B1 | 3/2013 | Nies et al. |
| 8,411,841 B2 | 4/2013 | Edwards et al. |
| 8,442,033 B2 | 5/2013 | Williams et al. |
| 8,467,518 B2 | 6/2013 | Blair |
| 8,526,597 B2 | 9/2013 | Geva et al. |
| 8,543,393 B2 | 9/2013 | Barnish |
| 8,611,523 B2 | 12/2013 | Conway et al. |
| 8,649,499 B1 | 2/2014 | Koster et al. |
| 8,670,552 B2 | 3/2014 | Keren et al. |
| 8,675,824 B1 | 3/2014 | Barnes et al. |
| 8,706,498 B2 | 4/2014 | George |
| 8,761,376 B2 | 4/2014 | Pande et al. |
| 8,718,266 B1 | 5/2014 | Williams et al. |
| 8,719,016 B1 | 5/2014 | Ziv et al. |
| 8,724,778 B1 | 5/2014 | Barnes et al. |
| 8,725,518 B2 | 5/2014 | Waserblat et al. |
| 8,738,374 B2 | 5/2014 | Jaroker |
| 8,787,552 B1 | 7/2014 | Zhao et al. |
| 8,798,254 B2 | 8/2014 | Naparstek et al. |
| 8,806,455 B1 | 8/2014 | Katz |
| 8,861,708 B2 | 10/2014 | Kopparapu et al. |
| 8,903,078 B2 | 12/2014 | Blair |
| 8,909,590 B2 | 12/2014 | Newnham et al. |
| 8,971,517 B2 | 3/2015 | Keren et al. |
| 8,990,238 B2 | 3/2015 | Goldfarb |
| 9,020,920 B1 | 4/2015 | Haggerty et al. |
| 9,025,736 B2 | 5/2015 | Meng et al. |
| 9,053,750 B2 | 6/2015 | Gibbon et al. |
| 9,083,799 B2 | 7/2015 | Loftus et al. |
| 9,092,733 B2 | 7/2015 | Sneyders et al. |
| 9,135,630 B2 | 9/2015 | Goldfarb et al. |
| 9,148,511 B2 | 9/2015 | Ye et al. |
| 9,160,853 B1 | 10/2015 | Daddi et al. |
| 9,160,854 B1 | 10/2015 | Daddi et al. |
| 9,167,093 B2 | 10/2015 | Geffen et al. |
| 9,197,744 B2 | 11/2015 | Sittin et al. |
| 9,213,978 B2 | 12/2015 | Melamed et al. |
| 9,214,001 B2 | 12/2015 | Rawle |
| 9,232,063 B2 | 1/2016 | Romano et al. |
| 9,232,064 B1 | 1/2016 | Skiba et al. |
| 9,253,316 B1 | 2/2016 | Williams et al. |
| 9,262,175 B2 | 2/2016 | Lynch et al. |
| 9,269,073 B2 | 2/2016 | Sammon et al. |
| 9,270,826 B2 | 2/2016 | Conway et al. |
| 9,300,790 B2 | 3/2016 | Gainsboro et al. |
| 9,311,914 B2 | 4/2016 | Wasserbat et al. |
| 9,368,116 B2 | 6/2016 | Ziv et al. |
| 9,401,145 B1 | 7/2016 | Ziv et al. |
| 9,401,990 B2 | 7/2016 | Teitelman et al. |
| 9,407,768 B2 | 8/2016 | Conway et al. |
| 9,412,362 B2 | 8/2016 | Iannone et al. |
| 9,418,152 B2 | 8/2016 | Nissan et al. |

(56) References Cited

U.S. PATENT DOCUMENTS

| | | | |
|---|---|---|---|
| 9,420,227 B1 | 8/2016 | Shires et al. | |
| 9,432,511 B2 | 8/2016 | Conway et al. | |
| 9,460,394 B2 | 10/2016 | Krueger et al. | |
| 9,460,722 B2 | 10/2016 | Sidi et al. | |
| 9,497,167 B2 | 11/2016 | Weintraub et al. | |
| 9,503,579 B2 | 11/2016 | Watson et al. | |
| 9,508,346 B2 | 11/2016 | Achituv et al. | |
| 9,589,073 B2 | 3/2017 | Yishay | |
| 9,596,349 B1 | 3/2017 | Hernandez | |
| 9,633,650 B2 | 4/2017 | Achituv et al. | |
| 9,639,520 B2 | 5/2017 | Yishay | |
| 9,690,873 B2 | 6/2017 | Yishay | |
| 9,699,409 B1 | 7/2017 | Reshef | |
| 9,785,701 B2 | 10/2017 | Yishay | |
| 9,936,066 B1 | 4/2018 | Mammen et al. | |
| 9,947,320 B2 | 4/2018 | Lembersky et al. | |
| 9,953,048 B2 | 4/2018 | Weisman et al. | |
| 9,953,650 B1 | 4/2018 | Falevsky | |
| 9,977,830 B2 | 5/2018 | Romano et al. | |
| 10,079,937 B2 | 9/2018 | Nowak et al. | |
| 10,134,400 B2 | 11/2018 | Ziv et al. | |
| 10,503,719 B1 | 12/2019 | Rice et al. | |
| 10,503,783 B1 | 12/2019 | Muniz Navarro et al. | |
| 10,504,050 B1 | 12/2019 | Rogynskyy et al. | |
| 10,521,443 B2 | 12/2019 | Brunets et al. | |
| 10,528,601 B2 | 1/2020 | Rogynskyy et al. | |
| 10,565,229 B2 | 2/2020 | Rogynskyy et al. | |
| 10,599,653 B2 | 3/2020 | Rogynskyy et al. | |
| 10,649,999 B2 | 5/2020 | Rogynskyy et al. | |
| 10,657,129 B2 | 5/2020 | Rogynskyy et al. | |
| 2004/0021765 A1* | 2/2004 | Kubala | H04N 7/15 348/14.08 |
| 2004/0024598 A1 | 2/2004 | Srivastava et al. | |
| 2007/0129942 A1 | 6/2007 | Ban et al. | |
| 2007/0260564 A1 | 11/2007 | Peters et al. | |
| 2008/0300872 A1 | 12/2008 | Basu et al. | |
| 2009/0306981 A1 | 12/2009 | Cromack et al. | |
| 2010/0104086 A1 | 4/2010 | Park | |
| 2010/0211385 A1* | 8/2010 | Sehlstedt | G10L 25/78 704/214 |
| 2010/0246799 A1 | 9/2010 | Lubowich et al. | |
| 2011/0103572 A1* | 5/2011 | Blair | G06Q 10/00 379/265.06 |
| 2011/0217021 A1* | 9/2011 | Dubin | H04N 7/147 386/278 |
| 2013/0081056 A1 | 3/2013 | Hu et al. | |
| 2013/0300939 A1 | 11/2013 | Chou et al. | |
| 2014/0214402 A1 | 7/2014 | Diao et al. | |
| 2014/0220526 A1 | 8/2014 | Sylves | |
| 2014/0229471 A1 | 8/2014 | Galvin, Jr. et al. | |
| 2014/0278377 A1 | 9/2014 | Peters et al. | |
| 2015/0025887 A1* | 1/2015 | Sidi | G10L 17/04 704/245 |
| 2015/0066935 A1 | 3/2015 | Peters et al. | |
| 2016/0014373 A1* | 1/2016 | LaFata | H04N 7/152 348/14.08 |
| 2016/0071520 A1* | 3/2016 | Hayakawa | G10L 17/04 704/247 |
| 2016/0110343 A1 | 4/2016 | Kumar Rangarajan Sridhar | |
| 2016/0275952 A1 | 9/2016 | Kashtan et al. | |
| 2016/0314191 A1 | 10/2016 | Markman et al. | |
| 2017/0270930 A1* | 9/2017 | Ozmeral | G10L 17/00 |
| 2017/0323643 A1* | 11/2017 | Arslan | G10L 17/00 |
| 2018/0181561 A1* | 6/2018 | Raanani | G06Q 30/01 |
| 2018/0239822 A1 | 8/2018 | Reshef et al. | |
| 2018/0254051 A1* | 9/2018 | Church | H04M 3/51 |
| 2018/0307675 A1 | 10/2018 | Akkiraju et al. | |
| 2018/0342250 A1 | 11/2018 | Cohen et al. | |
| 2019/0155947 A1 | 5/2019 | Chu et al. | |
| 2019/0304470 A1* | 10/2019 | Ghaemmaghami | G10L 17/06 |
| 2020/0177403 A1 | 6/2020 | Vazquez-Rivera | |

OTHER PUBLICATIONS

Anguera., "Speaker Independent Discriminant Feature Extraction for Acoustic Pattern-Matching", IEEE International Conference on Acoustics, Speech and Signal Processing (ICASSP), pp. 1-4, Mar. 25-30, 2012.

Church et al., "Speaker Diarization: A Perspective on Challenges and Opportunities From Theory to Practice", IEEE International Conference on Acoustics, Speech and Signal Processing (ICASSP), pp. 4950-4954, Mar. 5-9, 2017.

Hieu., "Speaker Diarization in Meetings Domain", A thesis submitted to the School of Computer Engineering of the Nanyang Technological University, pp. 1-149, Jan. 2015.

Shum et al., "Unsupervised Methods for Speaker Diarization: An Integrated and Iterative Approach", IEEE Transactions on Audio, Speech, and Language Processing, vol. 21, No. 10, pp. 2015-2028, Oct. 2013.

Serrano, "Speaker Diarization and Tracking in Multiple-Sensor Environments", Dissertation presented for the degree of Doctor of Philosophy, Universitat Politecnica de Catalunya, Spain, pp. 1-323, Oct. 2012.

Friedland et al., "Multi-modal speaker diarization of real-world meetings using compressed-domain video features", International Conference on Acoustics, Speech and Signal Processing (ICASSP'09), pp. 1-4, Apr. 19-24, 2009.

Anguera., "Speaker Diarization: A Review of Recent Research", First draft submitted to IEEE TASLP, pp. 1-15, Aug. 19, 2010.

Balwani et al., "Speaker Diarization: A Review and Analysis", International Journal of Integrated Computer Applications & Research (IJICAR), vol. 1, issue 3, pp. 1-5, year 2015.

Evans et al., "Comparative Study of Bottom-Up and Top-Down Approaches to Speaker Diarization", IEEE Transactions on Audio, Speech, and Language Processing, vol. 20, No. 2, pp. 382-392, Feb. 2012.

Sasikala et al., "A Survey on Speaker Diarization Approach for Audio and Video Content Retrieval", International Journal of Research and Computational Technology, vol. 5, issue 4, p. 1-8, Dec. 2013.

Moattar et al., "A review on speaker diarization systems and approaches", Speech Communication, vol. 54, No. 10, pp. 1065-1103, year 2012.

Wang et al., "Speaker Diarization with LSTM, Electrical Engineering and Systems Science", IEEE International Conference on Acoustics, Speech and Signal Processing, Calgary, Canada, pp. 5239-5243, Apr. 15-20, 2018.

Eisenstein et al., "Bayesian Unsupervised Topic Segmentation", Proceedings of the 2008 Conference on Empirical Methods in Natural Language Processing, Association for Computational Linguistics, pp. 334-343, Oct. 2008.

Sherman et al., "Using Hidden Markov Models for Topic Segmentation of Meeting Transcripts", Proceedings of the IEEE Spoken Language Technology Workshop 2008, pp. 185-188, year 2008.

Purver et al., "Unsupervised Topic Modelling for Multi-Party Spoken Discourse", Proceedings of the 44th Annual Meeting of the Association for Computational Linguistics, pp. 17-24, Jul. 2006.

EP Application # 17896398.9 Search Report dated Oct. 27, 2020.

EP Application # 20184576.5 Search Report dated Dec. 21, 2020.

Shafiei et al., "A Statistical Model for Topic Segmentation and Clustering," 21st Conference of the Canadian Society for Computational Studies of Intelligence, Canadian AI 2008: Advances in Artificial Intelligence, pp. 283-295, year 2008.

U.S. Appl. No. 16/520,374 Office Action dated Jun. 10, 2021.

U.S. Appl. No. 16/520,374 Office Action dated Dec. 7, 2021.

EP Application # 17896398.9 Office Action dated Dec. 20, 2021.

* cited by examiner

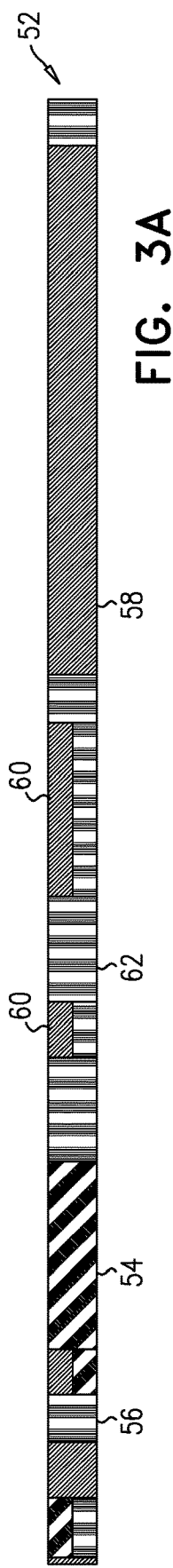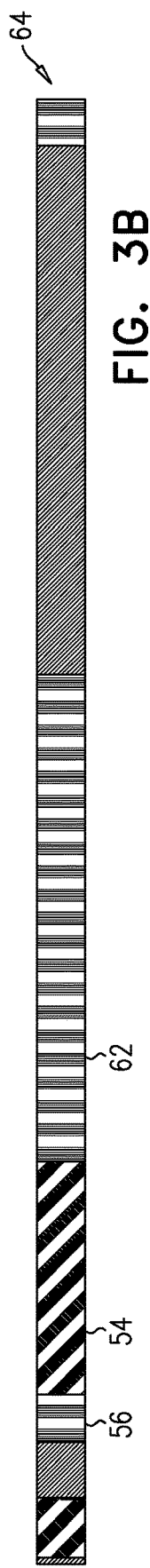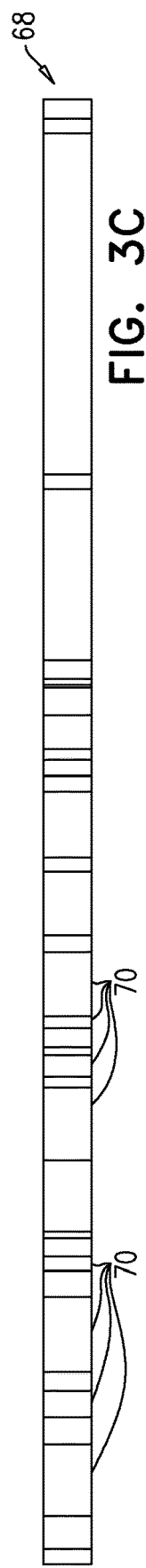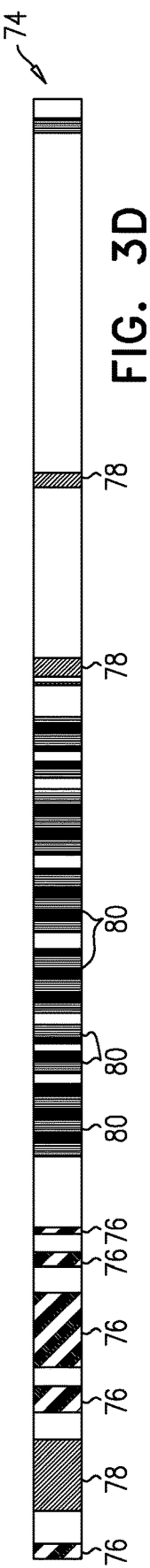

METADATA-BASED DIARIZATION OF TELECONFERENCES

CROSS-REFERENCE TO RELATED APPLICATION

This application claims the benefit of U.S. Provisional Patent Application 62/658,604, filed Apr. 17, 2018, which is incorporated herein by reference.

FIELD OF THE INVENTION

The present invention relates generally to methods, apparatus and software for speech analysis, and particularly to automated diarization of conversations between multiple speakers.

BACKGROUND

Speaker diarization is the process of partitioning an audio stream containing voice data into time segments according to the identity of the speaker in each segment.

It can be combined with automatic transcription of the audio stream in order to give an accurate rendition of the conversation during a conference, for example.

Speaker diarization is sometimes used in analyzing the sequence of speakers in a video teleconference. For example, U.S. Patent Application Publication 2013/0300939 describes a method that includes receiving a media file that includes video data and audio data; determining an initial scene sequence in the media file; determining an initial speaker sequence in the media file; and updating a selected one of the initial scene sequences and the initial speaker sequence in order to generate an updated scene sequence and an updated speaker sequence respectively.

SUMMARY

Embodiments of the present invention that are described hereinbelow provide improved methods, apparatus and software for automated analysis of conversations.

There is therefore provided, in accordance with an embodiment of the invention, a method for audio processing, which includes receiving, in a computer, a recording of a teleconference among multiple participants over a network including an audio stream containing speech uttered by the participants and conference metadata for controlling a display on video screens viewed by the participants during the teleconference. The audio stream is processed by the computer to identify speech segments, in which one or more of the participants were speaking, interspersed with intervals of silence in the audio stream. The conference metadata are parsed so as to extract speaker identifications, which are indicative of the participants who spoke during successive periods of the teleconference. The teleconference is diarized by labeling the identified speech segments from the audio stream with the speaker identifications extracted from corresponding periods of the teleconference.

In a disclosed embodiment, processing the audio stream includes applying a voice activity detector to identify as the speech segments parts of the audio stream in which a power of the audio signal exceeds a specified threshold.

Additionally or alternatively, labeling the identified speech segments measuring and compensating for a delay in transmission of the audio stream over the network relative to timestamps associated with the conference metadata.

In some embodiments, diarizing the teleconference includes labeling a first set of the identified speech segments with the speaker identifications extracted from the corresponding periods of the teleconference, extracting acoustic features from the speech segments in the first set, and labeling a second set of the identified speech segments using the extracted acoustic features to indicate the participants who spoke during the speech segments.

In one embodiment, labeling the second set includes labeling one or more of the speech segments for which the conference metadata did not provide a speaker identification. Additionally or alternatively, labeling the second set includes correcting one or more of the speaker identifications of the speech segments in the first set using the extracted audio characteristics.

In a disclosed embodiment, extracting the acoustic features includes building a respective statistical model of the speech of each participant based on the audio stream in the first set of the speech segments that were labeled as belonging to the participant, and labeling the second set includes comparing the statistical model to each of a sequence of time frames in the audio stream.

Additionally or alternatively, labeling the second set includes estimating transition probabilities between the speaker identifications based on the labeled speech segments in the first set, and applying the transition probabilities in labeling the second set of the speech segments. In one embodiment, applying the transition probabilities includes applying a dynamic programming algorithm over a series of time frames in the audio stream in order to identify a likeliest sequence of the participants to have spoken over the series of time frames.

Further additionally or alternatively, diarizing the teleconference includes extracting the acoustic features from the speech segments in the second set, and applying the extracted acoustic features in further refining a segmentation of the audio stream.

In some embodiments, the method includes analyzing speech patterns in the teleconference using the labeled speech segments. Analyzing the speech patterns may include measuring relative durations of speech by the participants and/or measuring a level of interactivity between the participants. Additionally or alternatively, analyzing the speech patterns includes correlating the speech patterns of a group of salespeople over multiple teleconferences with respective sales made by the salespeople in order to identify an optimal speech pattern.

There is also provided, in accordance with an embodiment of the invention, apparatus for audio processing, including a memory, which is configured to store a recording of a teleconference among multiple participants over a network including an audio stream containing speech uttered by the participants and conference metadata for controlling a display on video screens viewed by the participants during the teleconference. A processor is configured to process the audio stream so as to identify speech segments, in which one or more of the participants were speaking, interspersed with intervals of silence in the audio stream, to parse the conference metadata so as to extract speaker identifications, which are indicative of the participants who spoke during successive periods of the teleconference, and to diarize the teleconference by labeling the identified speech segments from the audio stream with the speaker identifications extracted from corresponding periods of the teleconference.

There is additionally provided, in accordance with an embodiment of the invention, a computer software product, including a non-transitory computer-readable medium in which program instructions are stored, which instructions, when read by a computer, cause the computer to store a recording of a teleconference among multiple participants over a network including an audio stream containing speech uttered by the participants and conference metadata for controlling a display on video screens viewed by the participants during the teleconference, and to process the audio stream so as to identify speech segments, in which one or more of the participants were speaking, interspersed with intervals of silence in the audio stream, to parse the conference metadata so as to extract speaker identifications, which are indicative of the participants who spoke during successive periods of the teleconference, and to diarize the teleconference by labeling the identified speech segments from the audio stream with the speaker identifications extracted from corresponding periods of the teleconference.

The present invention will be more fully understood from the following detailed description of the embodiments thereof, taken together with the drawings in which:

BRIEF DESCRIPTION OF THE DRAWINGS

FIGS. 3A-3D are bar plots that schematically illustrate successive stages in segmentation of a conversation, in accordance with an embodiment of the invention;

DETAILED DESCRIPTION OF EMBODIMENTS

Figure 1:
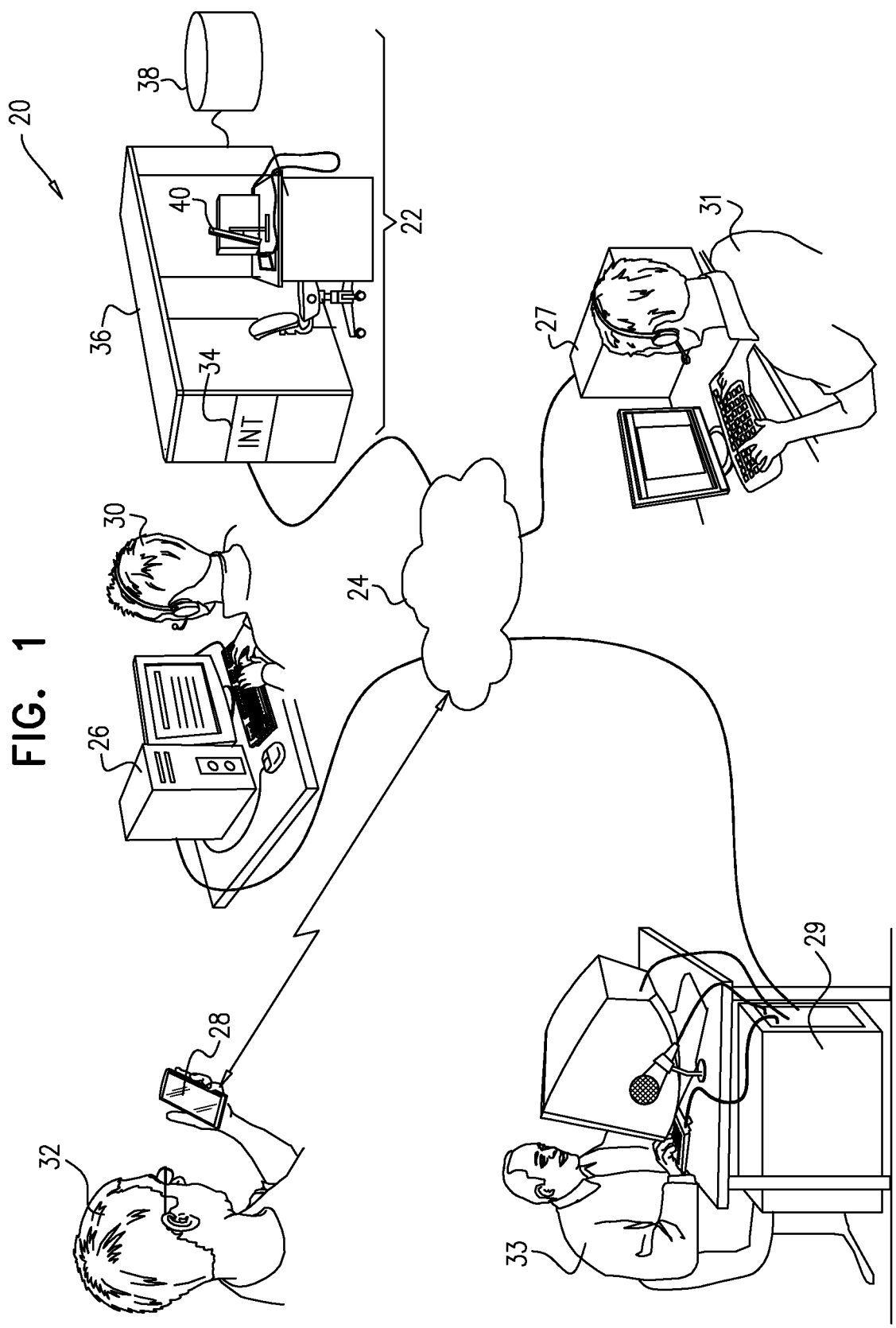
FIG. 1 is schematic pictorial illustration of a teleconferencing system, in accordance with an embodiment of the invention.

Methods of automatic speaker diarization that are known in the art tend to achieve only coarse segmentation and labeling of a multi-speaker conversation. In some applications, more accurate diarization is required.

For example, the operator or manager of a call center may wish to use automatic diarization to analyze the conversations held by salespeople with customers in order to understand and improve their sales skills and increase their success rate. In this context, the customer's overall speaking time is usually much smaller than that of the salesperson. On the other hand, detecting the customer's speech segments can be of higher importance in analyzing the conversation, including even short utterances (for example, "OK" or "aha"). Inaccurate diarization can lead to loss or misclassification of important cues like these, and thus decrease the effectiveness of the call analysis.

Some embodiments of the present invention that are described herein address these problems by using cues outside the audio stream itself. These embodiments are directed specifically to analyzing Web-based teleconferences, in which conferencing software transmits images and metadata that enable the participants to view a display on a video screen showing the conference participants and/or other information in conjunction with the audio stream containing speech uttered by the participants. Specifically, standard teleconferencing software applications automatically identify the participant who is speaking during successive periods of the teleconference, and transmit the speaker identification as part of the metadata stream that is transmitted to the participants. In some embodiments, the metadata comprises code in a markup language, such as the Hypertext Markup Language (HTML), which is used by client software on the participants' computers in driving the display during the teleconference; but other sorts of metadata may alternatively be used for the present purposes.

In the present embodiments, a diarizing computer receives a recording of the audio stream and corresponding metadata of a Web-based teleconference. The computer processes the audio stream to identify speech segments, in which one or more of the participants were speaking, interspersed with intervals of silence in the audio stream. The computer also parses the conference metadata so as to extract the speaker identifications, and then diarizes the teleconference by labeling the identified speech segments from the audio stream with the speaker identifications extracted from corresponding periods of the teleconference. The metadata is useful in resolving the uncertainty that often arises in determining which participant is speaking at any given time on the basis of the audio stream alone, and thus improves the quality of diarization, as well as the accuracy of transcription and analysis of the teleconference based on the diarization.

In many cases, however, the speaker identification provided by the conference metadata is still not sufficiently "fine-grained," in the sense that the minimal periods over which a speaker may be identified are long (typically on the order of at least one second). Precise diarization, particularly in short segments, can also be confused by network transmission delays and by segments in which more than one participant was speaking.

Therefore, in some embodiments of the present invention, after labeling a first set of speech segments using the conference metadata, the computer refines the speaker identifications on the basis of acoustic features extracted from the speech segments in this first set. In some embodiments, the computer develops a model, using these acoustic features, which indicates the likeliest speaker in each segment of the conversation, including even very short segments. This model is applied in analyzing and labeling a second set of the identified speech segments, instead of or in addition to the metadata-based labeling. In some cases, the labels of some of the speech segments in the first set, which were based on the metadata, are also corrected using the model.

The results of this fine-grained diarization can be used for various purposes, such as accurate, automatic transcription and analysis of conversation patterns. In one embodiment, the diarization is used in comparing sales calls made by different members of a sales team, in order to identify patterns of conversation that correlate with successful sales. The sales manager can use this information, for example, in coaching the members of the team to improve points in their conversational approach.

System Description

FIG. 1 is schematic pictorial illustration of a teleconferencing system 20, in accordance with an embodiment of the invention. A computer, such as a server 22, receives and records conversations conducted via a network 24, among pairs or groups of participants 30, 31, 32, 33, . . . , using respective computers 26, 27, 28, 29, Network 24 may comprise any suitable data communication network, such as the Internet. Computers 26, 27, 28, 29, . . . , may comprise any sort of computing devices with a suitable audio interface and video display, including both desktop and portable devices, such a laptops, tablets and smartphones.

The data stream among computers 26, 27, 28, 29, . . . , that is recorded by server 22 includes both an audio stream, containing speech uttered by the participants, and conference metadata. Server 22 may receive audio input from the conversations on line in real time, or it may, additionally or alternatively, receive recordings made and stored by other means. The conference metadata typically has the form of textual code in HTML or another markup language, for controlling the teleconference display on the video screens viewed by the participants. The conference metadata is typically generated by third-party teleconferencing software, separate from and independent of server 22. As one example, server 22 may capture and collect recordings of Web conferences using the methods described in U.S. Pat. No. 9,699,409, whose disclosure is incorporated herein by reference.

Server 22 comprises a processor 36, such as a general-purpose computer processor, which is connected to network 24 by a network interface 34. Server 22 receives and stores a corpus of recorded conversations in memory 38, for processing by processor 36. Processor 36 autonomously diarizes the conversations, and may also transcribe the conversations and/or analyze the patterns of speech by the participants. At the conclusion of this process, processor 36 is able to present the distribution of the segments of the conversations and the respective labeling of the segments according to the participant speaking in each segment over the duration of the recorded conversations on a display 40.

Processor 36 typically carries out the functions that are described herein under the control of program instructions in software. This software may be downloaded to server 22 in electronic form, for example over a network. Additionally or alternatively, the software may be provided and/or stored on tangible, non-transitory computer-readable media, such as optical, magnetic, or electronic memory media.

Labeling Speech Segments Using Conference Metadata

Figure 2:
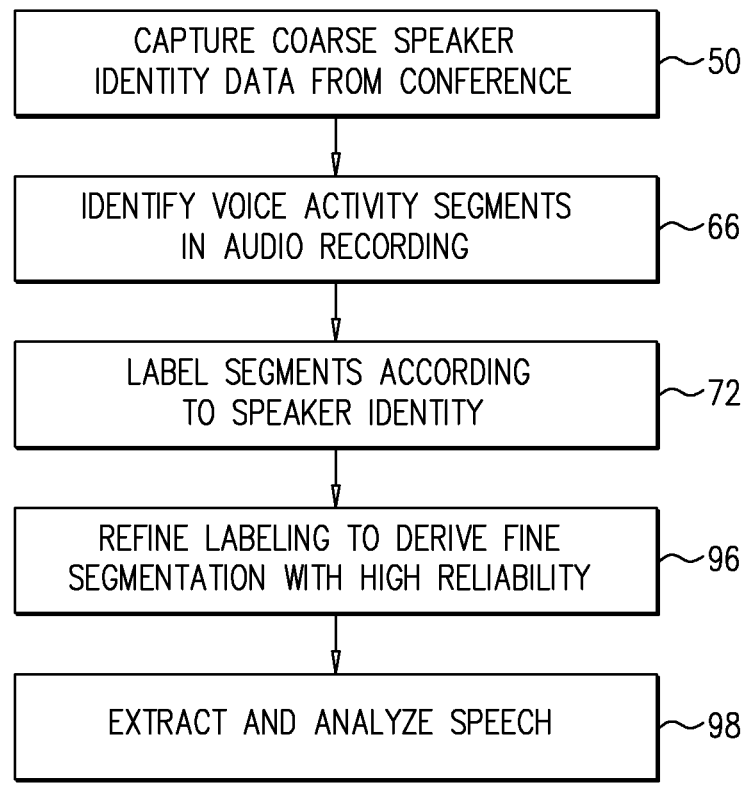
FIG. 2 is a flow chart that schematically illustrates a method for automatic analysis of a conference call, in accordance with an embodiment of the invention.

Reference is now made to FIGS. 2 and 3A-D, which schematically illustrate a method for automatic analysis of a conference call, in accordance with an embodiment of the invention. FIG. 2 is a flow chart showing the steps of the method, while FIGS. 3A-3D are bar plots that illustrate successive stages in segmentation of a conversation. For the sake of concreteness and clarity, the method will be described hereinbelow with reference to processor 36 and the elements of system 20, and specifically to a teleconference between participants 30 and 33, using respective computers 26 and 29. The principles of this method, however, may be applied to larger numbers of participants and may be implemented in other sorts of Web-based conferencing systems and computational configurations.

In order to begin the analysis of a conversation, processor 36 captures both an audio stream containing speech uttered by the participants and coarse speaker identity data from the conversation, at a data capture step 50. The speaker identity data has the form of metadata, such as HTML, which is provided by the teleconferencing software and transmitted over network 24. The teleconferencing software may apply various heuristics in deciding on the speaker identity at any point in time, and the actual method that is applied for this purpose is beyond the scope of the present description. The result is that at each of a sequence of points in time during the conversation, the metadata indicates the identity of the participant who is speaking, or may indicate that multiple participants are speaking or that no one is speaking.

To extract the relevant metadata, processor 36 may parse the structure of the Web pages transmitted by the teleconferencing application. It then applies identification rules managed within server 22 to determine which parts of the page indicate speaker identification labels. For example, the identification rules may indicate the location of a table in the HTML hierarchy of the page, and classes or identifiers (IDs) of HTML elements may be used to traverse the HTML tree and determine the area of the page containing the speaker identification labels. Additional rules may indicate the location of specific identification labels. For example, if the relevant area of the page is implemented using an HTML table tag, individual speaker identification labels may be implemented using HTML <tr> tags. In such a case, processor 36 can use the browser interface, and more specifically the document object model application program interface (DOM API), to locate the elements of interest. Alternatively, if the teleconferencing application is a native application, such as a Microsoft Windows® native application, processor 36 may identify the elements in the application using the native API, for example the Windows API.

An extracted metadata stream of this sort is shown, for example, in Table I below:

Table I—Speaker Identity Metadata

{"time":36.72, "type":"SpeakersSamplingEvent", "data": ("speakers":[{"name":"Marie Antoinette"}]}}
{"time":36.937, "type":"SpeakersSamplingEvent", "data": ("speakers":[{"name":"Marie Antoinette"}]}}
{"time":37.145, "type":"SpeakersSamplingEvent", "data": ("speakers":[{"name":"Marie Antoinette"}]}}
{"time":37.934, "type":"SpeakersSamplingEvent", "data": ("speakers":[ ]}}
{"time":38.123,"type":"SpeakersSamplingEvent","data": ("speakers":[ ]}}
{"time":38.315,"type":"SpeakersSamplingEvent","data": ("speakers":[ ]}}
{"time":41.556, "type":"SpeakersSamplingEvent", "data": ("speakers":[{"name":"Marie Antoinette"}]}}
{"time":41.754, "type": "SpeakersSamplingEvent", "data": ("speakers":[{"name":"Marie Antoinette"}, {"name": "Louis XVI"}]}}
{"time":42.069, "type": "SpeakersSamplingEvent", "data": ("speakers":[{"name":"Louis XVI"}]}}
{"time":44.823, "type": "SpeakersSamplingEvent", "data": ("speakers":[{"name":"Louis XVI"}]}}
{"time":46.923, "type": "SpeakersSamplingEvent", "data": ("speakers":[{"name":"Louis XVI"}]}}

The speaker identity metadata are shown graphically as a bar plot 52 in FIG. 3A, corresponding to approximately one minute of a conference. Segments 54 and 56 are identified unequivocally in the metadata as belonging to participants 30 and 33, respectively, meaning that the teleconferencing software identified participant 30 as the speaker during segment 54, and participant 33 as the speaker during segment 56. The teleconferencing software was unable to identify any speaker during a segment 58 (perhaps because both participants were silent), and therefore, no speaker is associated with this segment. Another segment 62 is also identified with participant 33, but is interrupted by two uncertain sub-segments 60, in which the metadata indicate that the identity of the speaker is unclear, for example because of background noise or both participants speaking at once.

To facilitate labeling of audio segments, processor 36 filters the raw metadata received from the conferencing data stream to remove ambiguities and gaps. For example, the processor may merge adjacent speaker labels and close small gaps between labels. FIG. 3B shows the result of applying this process to the segments of the preceding figure as a bar plot 64.

Returning now to FIG. 2, processor 36 applies a voice activity detector to the actual audio stream, and thus identifies the segments in which one of the participants was speaking, at a voice detection step 66. For example, processor 36 may identify as speech any segment in the audio stream in which the power of the audio signal exceeded a specified threshold. Alternatively or additionally, spectral and/or temporal criteria may be applied in order to distinguish speech segments from noise. FIG. 3C shows the result of this step as a bar plot 68, containing speech segments 70 interspersed with periods of silence. This step does not typically identify which participant was speaking during each segment 70.

Processor 36 applies the filtered metadata extracted at step 50 to the voice activity data obtained from step 66 in labeling speech segments 70, at a segment labeling step 72. Speech segments 70 in the audio stream are labeled at step 66 when they can be mapped consistently to exactly one metadata label. (Examples of difficulties that can occur in this process are explained below with reference to FIGS. 4A-4C.) FIG. 3D shows the result of this step as a bar plot 74. Segments 76 are now labeled as belonging to participant 30, while segments 80 are labeled as belonging to participant 33. The labeling of segments 78, however, remains ambiguous, because the metadata captured at step 50 did not identify the speakers during these segments. Segments 78 therefore have no speaker labels at this stage.

Figure 4A:
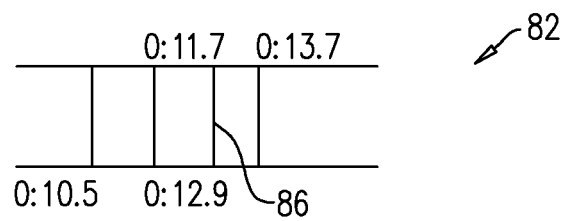
FIGS. 4A-4C are bar plots that schematically show details in the process of segmenting a conversation, in accordance with an embodiment of the invention.
Figure 4B:
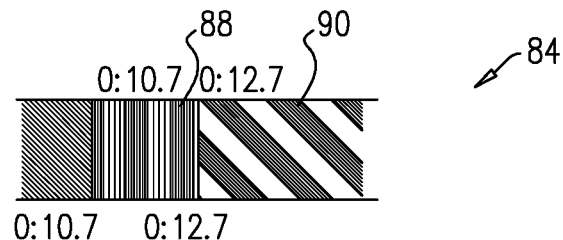
Figure 4C:
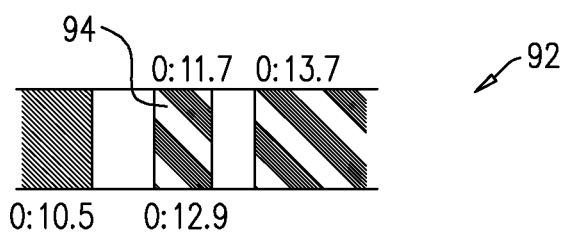

FIGS. 4A-4C are bar plots 82, 84 and 92, respectively, that schematically show details in the process of segmenting a conversation, in accordance with an embodiment of the invention. In these figures, the numbers marked above and below the bar plots refer to the beginning and ending times of the segments appearing in the plots. Bar plot 82 includes a voice activity segment 86, which appears to cross the boundary between two segments 88 and 90 in bar plot 84, which have different, respective speaker labels in the conference metadata. The reason for the discrepancy between the audio and metadata streams is a delay in transmission of the audio stream over network 24, relative to the timestamps applied in the conference metadata.

To compensate for this discrepancy, processor 36 may estimate the delay in network transmission between computers 26 and 29, as well as between these computers and server 22. For this purpose, for example, processor 36 may transmit and receive test packets over network 24. Additionally or alternatively, processor 36 may infer the delay by comparing the patterns of segments in bar plots 82 and 84. In the present example, the delay is found to be about 1 sec, and processor 36 therefore matches voice activity segment 86 to metadata segment 90. As a result, bar plot 92 in FIG. 4C shows that original voice activity segment 86 has now become a labeled segment 94, in which participant 30 is identified as the speaker.

Returning again to FIG. 2, at this point processor 36 will generally have labeled most of the segments of the audio stream, as illustrated by segments 76 and 80 in FIG. 3D. Some segments, however, such as segments 78, may remain unlabeled, because the conference metadata did not provide speaker identifications that could be matched to these latter segments unambiguously. Furthermore, short segments in which one of the participants was speaking may have been incorrectly merged at this stage with longer segments that were identified with another speaker, or may have been incorrectly labeled.

To rectify these problems and thus provide finer-grained analysis, processor 36 refines the initial segmentation in order to derive a finer, more reliable segmentation of the audio stream, at a refinement step 96. For this purpose, as noted earlier, processor 36 extracts acoustic features from the speech segments that were labeled at step 72 based on the conference metadata. The processor applies these acoustic features in building a model, which can be optimized to maximize the likelihood that each segment of the conversation will be correctly associated with a single speaker. This model can be used both in labeling the segments that could not be labeled at step 72 (such as segments 78) and in correcting the initial labeling by relabeling, splitting and/or merging the existing segments. Techniques that can be applied in implementing step 96 are described below in greater detail.

Once this refinement of the segment labeling has been completed, processor 36 automatically extracts and analyzes features of the participants' speech during the conference, at an analysis step 98. For example, processor 36 may apply the segmentation in accurately transcribing the conference, so that the full dialog is available in textual form. Additionally or alternatively, processor 36 may analyze the temporal patterns of interaction between the conference participants, without necessarily considering the content of the discussion.

Refinement of Segmentation and Labeling

Figure 5:
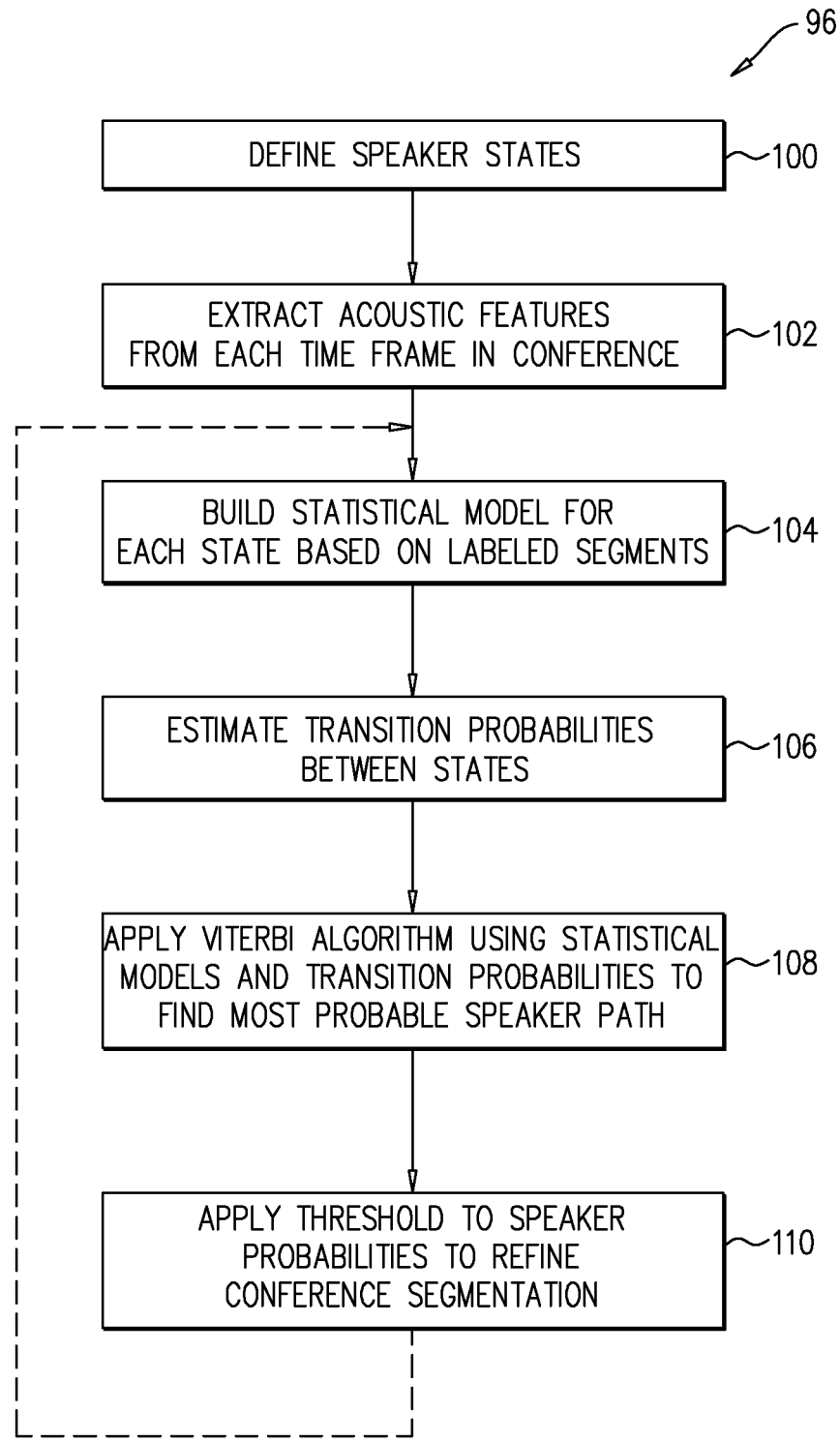
FIG. 5 is a flow chart that schematically illustrates a method for refining the segmentation of a conversation, in accordance with an embodiment of the invention.

FIG. 5 is a flow chart that schematically shows details of a method for refining the segmentation of a conversation, in accordance with an embodiment of the invention. Processor 36 can apply this method in implementing step 96 (FIG. 2). The present method uses a statistical model, such as a Gaussian Mixture Model (GMM), to characterize the speakers in the conversation, together with a state-based model, such as a Hidden Markov Model (HMM), to track transitions between speakers. Alternatively, other refinement techniques can be applied at step 96. Furthermore, the present method can be used in refining an initial segmentation that was accomplished by other means, as well, not necessarily based on conference metadata.

To begin the refinement process, processor 36 defines a set of speaker states, corresponding to the speakers identified by the conference metadata (step 50 in FIG. 2), at a state definition step 100. Given N speakers, processor 36 will define N+1 corresponding states, wherein state zero is associated with silence. In addition, processor 36 divides the audio recording (received at step 66) into a series of T time frames and extracts acoustic features $x_t$ from the audio signal in each time frame $t \in [1,T]$, at a feature extraction step 102. Typically, the time frames are short, for example as short as 25 ms, and may overlap with one another. The acoustic features may be defined using any suitable criteria that are known in the art, for example using Mel-frequency cepstral coefficients (MFCCs), i-vectors, or neural network embedding.

For each state $i \in \{0, N\}$, processor 36 builds a respective statistical model, based on the segments of the audio stream that were labeled previously (for example, at step 72) with specific speaker identities, at a model construction step 104. In other words, each state i is associated with a corresponding participant; and processor 36 uses the features of the audio signals recorded during the segments during which participant i was identified as the speaker in building the statistical model for the corresponding state. Any suitable sort of statistical model that is known in the art may be used for this purpose. In the present embodiment, processor 36 builds a Gaussian mixture model (GMM) for each state, G(x|s=i), i.e., a superposition of Gaussian distributions with K centers, corresponding to the mean values for participant i of the K statistical features extracted at step 102. The covariance matrix of the models may be constrained, for example, diagonal.

The set of speaker states can be expanded to include situations other than silence and a single participant speaking. For example, a "background" or "multi-speaker" state can be added and characterized using all speakers or pairs of speakers, so that the model will be able to recognize and handle two participants talking simultaneously. Time frames dominated by background noises, such as music, typing sounds, and audio event indicators, can also be treated as distinct states.

Based on the labeled segments, processor 36 also builds a matrix of the transition probabilities T(j|i) between the states in the model, meaning the probability that after participant i spoke during time frame t, participant j will be the speaker in time frame t+1:

$$T(j \mid i) = Pr(s_{t+1} = j \mid s_t = i) = \sum_{s_t = i} \delta(s_{t+1}, j) \Big/ \sum_{s_t = i} 1$$

Here $s_t$ is the state in frame t, and $\delta$ is the Kronecker delta function. The transition matrix will typically be strongly diagonal (meaning that in the large majority of time frames, the speaker will be the same as the speaker in the preceding time frame). The matrix may be biased to favor transitions among speakers using additive smoothing of the off-diagonal elements, such Laplace add-one smoothing.

Processor 36 also uses the state $s_t$ in each labeled time frame t to estimate the start probability P(j) for each state j by using the marginal observed probability:

$$P(j) = Pr(s_t = j) = \sum_{t=1}^{T} \delta(s_t, j) / T$$

Here again, smoothing may be used to bias the probabilities of states with low rates of occurrence.

Using the statistical model developed at step 104 and the probabilities calculated at step 106, processor 36 applies a dynamic programming algorithm in order to find the likeliest sequence of speakers over all of the time frames t=0, 1, . . . , T, at a speaker path computation step 108. For example, processor 36 may apply the Viterbi algorithm at this step, which will give, for each time frame, an identification of the participant likeliest to have spoken in that time frame, along with a measure of confidence in the identification, i.e., a probability value that the speaker state in the given time frame is correct. Before performing the speaker path computation, processor 36 may add chains of internal states to the model, for example by duplicating each speaker state multiple times and concatenating them with a certain transition probability. These added states create an internal Markov chain, which enforces minimal speaker duration and thus suppresses spurious transitions.

As a result of the computation at step 108, time frames in segments of the audio stream that were not labeled previously will now have speaker states associated with them. Furthermore, the likeliest-path computation may assign speaker states to time frames in certain segments of the audio stream that are different from the participant labels that were previously attached to these segments.

Processor 36 uses these new speaker state identifications in refining the segmentation of the audio stream, at a segmentation refinement step 110. To avoid errors at this stage, the processor typically applies a threshold to the speaker state probability values, so that only speaker state identifications having high measures of confidence are used in the resegmentation. Following step 110, some or all of the segments of the conversation that were previously unlabeled may now be assigned labels, indicating the participant who was speaking during each segment or, alternatively, that the segment was silent. Additionally or alternatively, segments or parts of segments that were previously labeled erroneously as belonging to a given participant may be relabeled with the participant who was actually speaking. In some cases, the time borders of the segments may be changed, as well.

In the first iteration through steps 104-110, the speaker identity labels assigned at step 72 (FIG. 2) are used as the baseline for building the statistical model and estimating transition probabilities. Following this first iteration, steps 104-110 may be repeated, this time using the resegmentation that was generated by step 110. One or more additional iterations of this sort will refine the segmentation still further, and will thus provide more accurate diarization of the conference. Processor 36 may continue these repeat iterations until it reaches a stop criterion, such as a target number of iterations or a target overall confidence level.

Figure 6A:
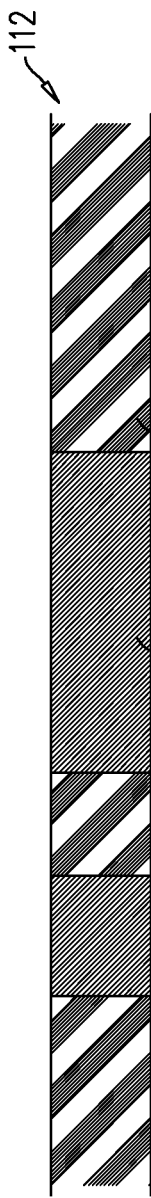
FIGS. 6A-6D are bar plots that schematically show details in the process of segmenting a conversation, in accordance with another embodiment of the invention.
Figure 6B:
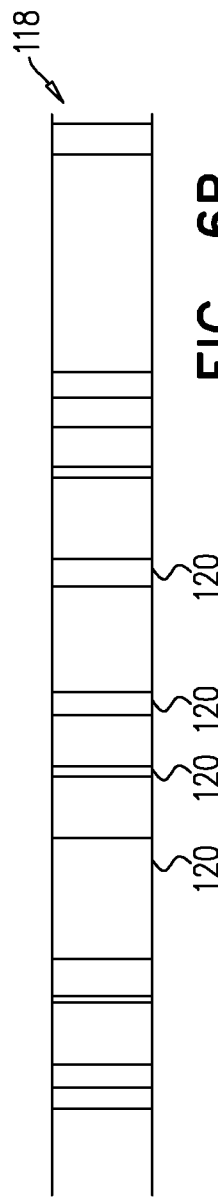
Figure 6C:
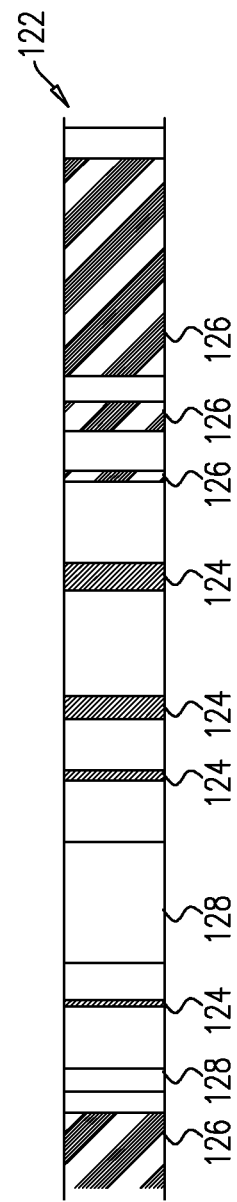

FIGS. 6A-6D are bar plots that schematically show details in the process of segmenting a conversation using the method of claim 5, in accordance with an embodiment of the invention. FIG. 6A shows a bar plot 112 in which segments 114 and 116 have been identified in the conference metadata (step 50 in FIG. 2). FIG. 6B shows a bar plot 118 in which voice activity segments 120 are identified in the audio stream (step 66 in FIG. 2). In FIG. 6C, a bar plot 122 shows how processor 36 has labeled voice activity segments 120 according to the speaker identifications in plot 112. Segments 124 and 126 are now labeled in accordance with the identities indicated by the speaker identifications of segments 114 and 116. Segments 128, however, remain unlabeled, for example due to uncertainty in the time offset between the audio stream and the metadata timestamps, as explained above.

Figure 6D:
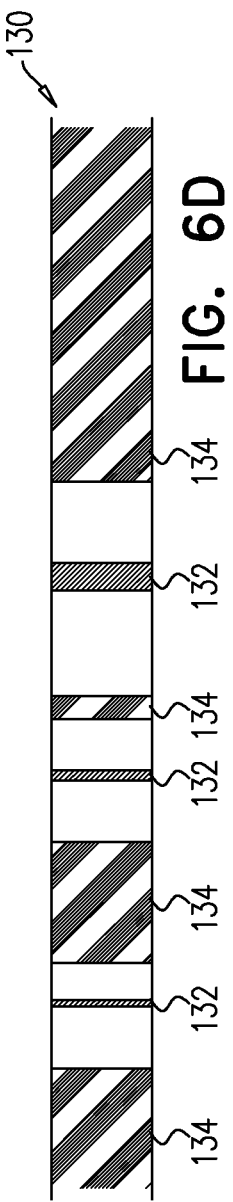

FIG. 6D is a bar plot 130 showing the results of refinement of the segmentation and labeling following application of the method of FIG. 5. Segments 132 in plot 130 are labeled with the same speaker identification as segments 124 in plot 122, and segments 134 are labeled with the same speaker identification as segments 126. Segments 128, which were unidentified by the conference metadata in plot 122, have now been labeled with the speaker identification of segments 134 based on the refined labeling generated at step 110. Gaps between segments 126 in plot 122 have also been filled in within segments 134. In addition, the metadata-based speaker label of segment 124 beginning at time 38:31.8 in plot 122 has been corrected in the corresponding segment 134 in plot 130.

In the example shown in FIG. 6D, a certain portion of the previous segmentation and labeling were found to disagree with the statistical model and were therefore corrected. In some cases, however, the level of discrepancy between the metadata-based labels and the segmentation and labeling generated by the statistical model may be so great as to cast suspicion on the accuracy of the metadata as a whole. In such cases, processor 36 may revert to blind diarization (irrespective of the conference metadata) as its starting point, or it may alert a human system operator to the discrepancy.

Additionally or alternatively, processor 36 may assign different levels of confidence to the metadata-based labels, thereby accounting for potential errors in the metadata-based segmentation. Furthermore, the processor may ignore speech segments with unidentified speech, as the metadata-based labels of these segments might exhibit more errors. Additionally or alternatively, processor 36 may apply a learning process to identify the parts of a conference in which it is likely that the metadata are correct. Following this learning phase of the algorithm, the processor can predict the segmentation of these segments, as in the example shown in FIGS. 6C-6D.

For example, in one embodiment, processor 36 may implement an artificial neural network. This embodiment treats the labeling and segmentation problem as a "sequence-to-sequence" learning problem, where the neural network learns to predict the coarse segmentation using the speech features as its input.

In this embodiment, a network, such as a convolutional neural network (CNN) or a Recurrent Neural Network (RNN, including networks with long short-term memory [LSTM]cells, Gated Recurrent Units (GRU's), Vanilla RNN's or any other implementation), is used to learn the transformation between acoustic features and speakers. The network is trained to predict the metadata labels on a given conversation. After training is completed, the network predicts the speaker classes without knowledge of the metadata labels, and the network output is used as the output of the resegmentation process.

The network learning process can use either a multiclass architecture, multiple binary classifiers with joint embedding, or multiple binary classifiers without joint embedding. In a multiclass architecture, the network predicts one option from a closed set of options (e.g. Speaker A, Speaker B, Speaker A+B, Silence, Unidentified Speaker etc.). In an architecture of multiple binary classifiers, the network provides multiple predictions, one for each possible speaker, predicting whether the speaker talked during the period (including simultaneously predicting whether Speaker A talked, and whether speaker B talked).

Use of Diarization Results in Coaching Salespeople

In some embodiments of the present invention, server 22 diarizes a large body of calls made by salespeople in a given organization, and outputs the results to a sales manager and/or to the salespeople themselves as an aid in improving their conference behavior. For example, server 22 may measure and output the following parameters, which measure relative durations and timing of speech by the participants (in this case, the salesperson and the customer) in each call:

Talk time: What percentage of the conversation is taken up by speech of the salesperson.

Longest monologue: How long does the salesperson speak without pausing for feedback. For example, processor 36 may measure the longest segment of continuous speech, allowing for only non-informative interruptions by the customer (such as "a-ha").

Longest customer story: A good salespeople is expected to be able to ask customers open-ended questions. Therefore, the processor measures the longest "story" by the customer, i.e., the longest continuous speech by the customer, allowing for only short interruptions by the salesperson (typically up to 5 sec).

Interactivity: How often does the call go back and forth between the parties. This parameter can be assigned a score, for example on a scale of 0 to 10.

Patience: How long does the salesperson wait before regaining the conversation after the customer speaks. In other words, does the salesperson wait to ensure that the customer has completed a question or statement, or does the salesperson respond quickly to what might be an incomplete statement?

Figure 7:
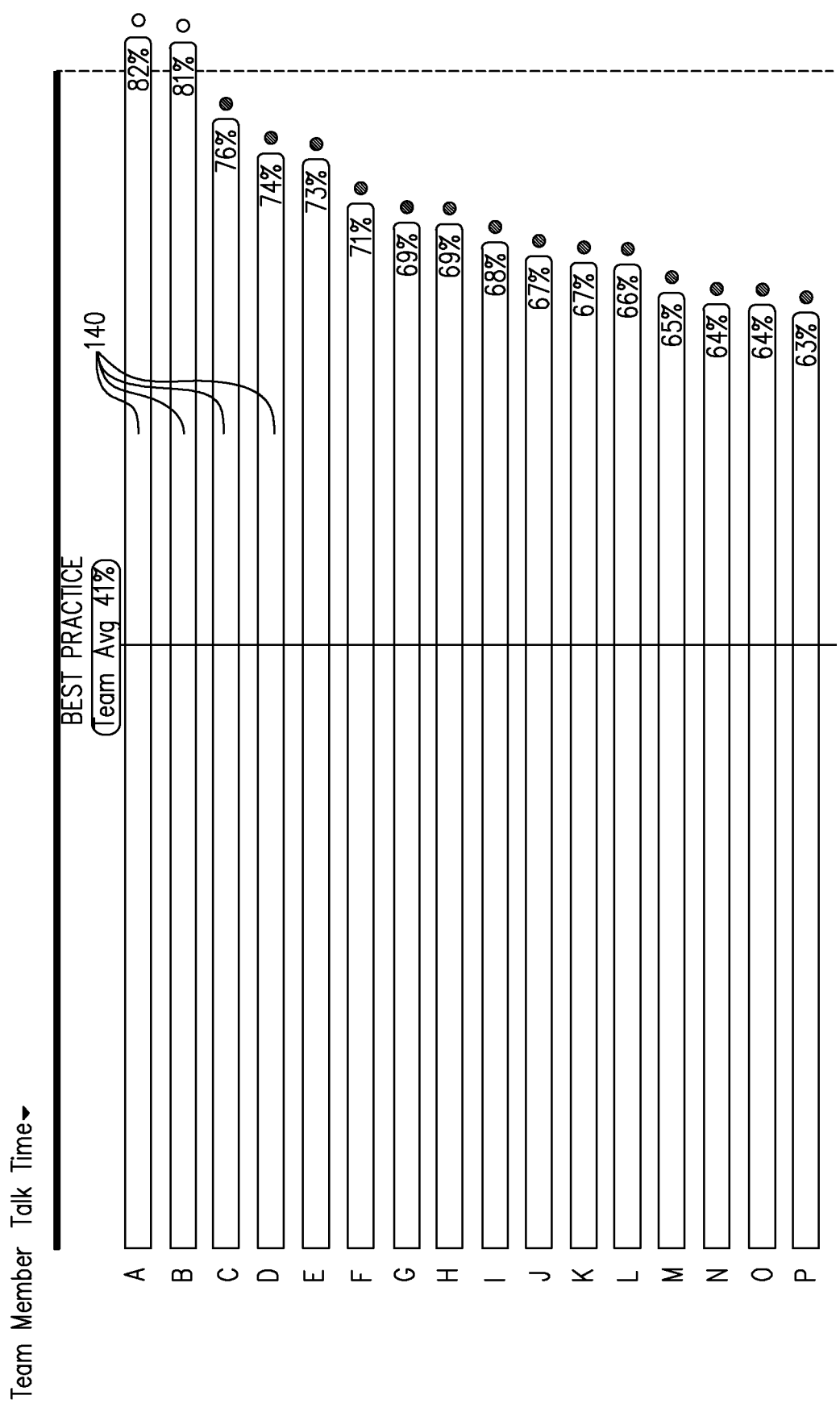
FIG. 7 is a bar chart that schematically shows results of diarization of multiple conversations involving a group of different speakers, in accordance with an embodiment of the invention.

FIG. 7 is a bar chart that schematically shows results of diarization of multiple conversations involving a group of different speakers, for example salespeople in an organization, in accordance with an embodiment of the invention. Each bar 140 shows the relative "talk time" of a respective salesperson, labeled "A" through "P" at the left side of the chart.

Processor 36 may correlate the talk times with sales statistics for each of the salespeople, taken from the customer relations management (CRM) database of the organization, for example. On this basis, processor 36 identifies the optimal speech patterns, such as optimal talk time and other parameters, for maximizing the productivity of sales calls. The salespeople can then receive feedback and coaching on their conversational habits that will enable them to increase their sales productivity.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for audio processing, comprising:
receiving, in a computer, a recording of a teleconference among multiple participants over a network including an audio stream containing speech uttered by the participants and conference metadata for controlling a display on video screens viewed by the participants during the teleconference;
processing the audio stream by the computer to identify speech segments, in which one or more of the participants were speaking, interspersed with intervals of silence in the audio stream;
parsing the conference metadata so as to extract speaker identifications, which are indicative of the participants who spoke during successive periods of the teleconference; and diarizing the teleconference based on both acoustic features from the audio stream and the speaker identifications extracted from the metadata accompanying the audio stream, in a process comprising:

labeling a first set of the identified speech segments from the audio stream with the speaker identifications extracted from the metadata accompanying the audio stream, wherein each speech segment from the audio stream, in the first set, is labelled with a speaker identification of a period corresponding to a time of the segment;

extracting acoustic features from the speech segments in the first set;

learning a correlation between the speaker identifications labelled to the segments in the first set, and the extracted acoustic features extracted from the corresponding segments of the first set; and labeling a second set of the identified speech segments using the learned correlation, to indicate the participants who spoke during the speech segments in the second set.

2. The method according to claim 1, wherein processing the audio stream comprises applying a voice activity detector to identify as the speech segments parts of the audio stream in which a power of the audio signal exceeds a specified threshold.

3. The method according to claim 1, wherein labeling the identified speech segments comprises measuring and compensating for a delay in transmission of the audio stream over the network relative to timestamps associated with the conference metadata.

4. The method according to claim 1, wherein labeling the second set comprises labeling one or more of the speech segments for which the conference metadata did not provide a speaker identification.

5. The method according to claim 1, wherein labeling the second set comprises correcting one or more of the speaker identifications of the speech segments in the first set.

6. The method according to claim 1, wherein learning the correlation comprises building a respective statistical model of the speech of each participant based on the audio stream in the first set of the speech segments that were labeled as belonging to the participant, and wherein labeling the second set comprises comparing the statistical model to each of a sequence of time frames in the audio stream.

7. The method according to claim 6, further comprising building an updated statistical model using the labeling of the second set of the identified speech segments and updating the labeling of the second set of the identified speech segments using the updated statistical model.

8. The method according to claim 6, further comprising repeating the building of an updated statistical model and the updating of the labeling of the second set of the identified speech segments until a target overall confidence level of the labelling is reached.

9. The method according to claim 1, wherein learning the correlation comprises estimating transition probabilities between the speaker identifications based on the labeled speech segments in the first set, and wherein labeling the second set comprises applying the transition probabilities in labeling the second set of the speech segments.

10. The method according to claim 9, wherein applying the transition probabilities comprises applying a dynamic programming algorithm over a series of time frames in the audio stream in order to identify a likeliest sequence of the participants to have spoken over the series of time frames.

11. The method according to claim 1, wherein diarizing the teleconference comprises extracting the acoustic features from the speech segments in the second set, and applying the extracted acoustic features in further refining a segmentation of the audio stream.

12. The method according to claim 1, and comprising analyzing speech patterns in the teleconference using the labeled speech segments.

13. The method according to claim 12, wherein analyzing the speech patterns comprises measuring relative durations of speech by the participants.

14. The method according to claim 12, wherein analyzing the speech patterns comprises measuring a level of interactivity between the participants.

15. The method according to claim 12, wherein analyzing the speech patterns comprises correlating the speech patterns of a group of salespeople over multiple teleconferences with respective sales made by the salespeople in order to identify an optimal speech pattern.

16. The method according to claim 1, wherein learning the correlation comprises training a neural network to predict the labelled speaker identifications of the segments in the first set, using the acoustic features extracted from the speech segments in the first set as inputs.

17. The method according to claim 1, wherein labeling the second set of the identified speech segments comprises applying a dynamic programming algorithm.

18. Apparatus for audio processing, comprising:

a memory, which is configured to store a recording of a teleconference among multiple participants over a network including an audio stream containing speech uttered by the participants and conference metadata for controlling a display on video screens viewed by the participants during the teleconference; and a processor, which is configured to process the audio stream so as to identify speech segments, in which one or more of the participants were speaking, interspersed with intervals of silence in the audio stream, to parse the conference metadata so as to extract speaker identifications, which are indicative of the participants who spoke during successive periods of the teleconference, and to diarize the teleconference based on both acoustic features from the audio stream and the speaker identifications extracted from the metadata accompanying the audio stream, in a process comprising:

labeling a first set of the identified speech segments from the audio stream with the speaker identifications extracted from the metadata accompanying the audio stream, wherein each speech segment from the audio stream, in the first set, is labelled with a speaker identification of a period corresponding to a time of the segment;

extracting acoustic features from the speech segments in the first set;

learning a correlation between the speaker identifications labelled to the segments in the first set, and the extracted acoustic features extracted from the corresponding segments of the first set; and labeling a second set of the identified speech segments using the learned correlation, to indicate the participants who spoke during the speech segments in the second set.

19. The apparatus according to claim 18, wherein the processor is configured to apply a voice activity detector to identify as the speech segments parts of the audio stream in which a power of the audio signal exceeds a specified threshold.

20. The apparatus according to claim 18, wherein the processor is configured to measure and compensate for a delay in transmission of the audio stream over the network relative to timestamps associated with the conference metadata in labeling the identified speech segments.

21. The apparatus according to claim 18, wherein labeling the second set comprises labeling one or more of the speech segments for which the conference metadata did not provide a speaker identification.

22. The apparatus according to claim 18, wherein labeling the second set comprises correcting one or more of the speaker identifications of the speech segments in the first set.

23. The apparatus according to claim 18, wherein learning the correlation comprises building a respective statistical model of the speech of each participant based on the audio stream in the first set of the speech segments that were labeled as belonging to the participant, and wherein labeling the second set comprises comparing the statistical model to each of a sequence of time frames in the audio stream.

24. The apparatus according to claim 18, wherein learning the correlation comprises estimating transition probabilities between the speaker identifications based on the labeled speech segments in the first set, and wherein labeling the second set comprises applying the transition probabilities in labeling the second set of the speech segments.

25. The apparatus according to claim 24, wherein applying the transition probabilities comprises applying a dynamic programming algorithm over a series of time frames in the audio stream in order to identify a likeliest sequence of the participants to have spoken over the series of time frames.

26. The apparatus according to claim 18, wherein diarizing the teleconference comprises extracting the acoustic features from the speech segments in the second set, and applying the extracted acoustic features in further refining a segmentation of the audio stream.

27. The apparatus according to claim 18, wherein the processor is configured to analyze speech patterns in the teleconference using the labeled speech segments.

28. The apparatus according to claim 27, wherein analyzing the speech patterns comprises measuring relative durations of speech by the participants.

29. The apparatus according to claim 27, wherein analyzing the speech patterns comprises measuring a level of interactivity between the participants.

30. The apparatus according to claim 27, wherein analyzing the speech patterns comprises correlating the speech patterns of a group of salespeople over multiple teleconferences with respective sales made by the salespeople in order to identify an optimal speech pattern.

31. A computer software product, comprising a non-transitory computer-readable medium in which program instructions are stored, which instructions, when read by a computer, cause the computer to store a recording of a teleconference among multiple participants over a network including an audio stream containing speech uttered by the participants and conference metadata for controlling a display on video screens viewed by the participants during the teleconference, and to process the audio stream so as to identify speech segments, in which one or more of the participants were speaking, interspersed with intervals of silence in the audio stream, to parse the conference metadata so as to extract speaker identifications, which are indicative of the participants who spoke during successive periods of the teleconference, and to diarize the teleconference based on both acoustic features from the audio stream and the speaker identifications extracted from the metadata accompanying the audio stream, in a process comprising:

labeling a first set of the identified speech segments from the audio stream with the speaker identifications extracted from the metadata accompanying the audio stream, wherein each speech segment from the audio stream, in the first set, is labelled with a speaker identification of a period corresponding to a time of the segment;

extracting acoustic features from the speech segments in the first set;

learning a correlation between the speaker identifications labelled to the segments in the first set, and the extracted acoustic features extracted from the corresponding segments of the first set; and labeling a second set of the identified speech segments using the learned correlation, to indicate the participants who spoke during the speech segments in the second set.

* * * * *